(12) United States Patent
Kita (10) Patent No.: US 9,764,785 B2
(45) Date of Patent: Sep. 19, 2017

(54) ROLLER OF TRACK-TYPE TRAVELING VEHICLE

(71) Applicant: KOMATSU LTD., Tokyo (JP)

(72) Inventor: Naoaki Kita, Hirakata (JP)

(73) Assignee: KOMATSU LTD., Tokyo (JP)

( * ) Notice: Subject to any disclaimer, the term of this patent is extended or adjusted under 35 U.S.C. 154(b) by 244 days.

(21) Appl. No.: 14/362,649

(22) PCT Filed: Feb. 27, 2014

(86) PCT No.: PCT/JP2014/054867
§ 371 (c)(1),
(2) Date: Jun. 4, 2014

(87) PCT Pub. No.: WO2014/203563
PCT Pub. Date: Dec. 24, 2014

(65) Prior Publication Data
US 2015/0274228 A1    Oct. 1, 2015

(30) Foreign Application Priority Data

Jun. 17, 2013   (JP) ................... 2013-126347

(51) Int. Cl.
*B62D 55/15*   (2006.01)
*B62D 55/14*   (2006.01)

(52) U.S. Cl.
CPC ............. *B62D 55/15* (2013.01); *B62D 55/14* (2013.01)

(58) Field of Classification Search
CPC ........ B62D 55/15; B62D 55/14; B62D 55/08; B62D 55/145; B62D 55/0966
See application file for complete search history.

(56) References Cited

U.S. PATENT DOCUMENTS 3,586,398 A * 6/1971 Dadds ................... B62D 55/15
  384/418
3,744,860 A   7/1973 Casey
(Continued)

FOREIGN PATENT DOCUMENTS

| CN | 201385709 Y | 1/2010 |
| CN | 202783474 U | 3/2013 |

(Continued)

*Primary Examiner* — Hau Phan
(74) *Attorney, Agent, or Firm* — Drinker Biddle & Reath LLP (57) ABSTRACT

A roller of a track-type traveling vehicle which can increase the life of a bearing supporting a roller shell is provided. The roller includes: a shaft having a cylindrical outer circumferential surface; a roller shell arranged to surround a portion of the outer circumferential surface of the shaft in a circumferential direction, and having a cylindrical inner circumferential surface which faces the outer circumferential surface, and an annular end surface; a collar fixed to the shaft and having an annular facing surface which faces the end surface; a radial sliding bearing arranged between the outer circumferential surface and the inner circumferential surface; and a thrust sliding bearing arranged between the end surface and the facing surface and provided separately from the radial sliding bearing. The roller is provided with an anti-rotation structure which prevents relative rotation of the thrust sliding bearing with respect to the roller shell.

20 Claims, 6 Drawing Sheets

(56) References Cited

U.S. PATENT DOCUMENTS

| | | | | |
|---|---|---|---|---|
| 3,797,895 A * | 3/1974 | Tomizawa | ......... | B62D 55/0966 152/49 |
| 3,866,985 A | 2/1975 | Whitehurst | | |
| 3,910,128 A * | 10/1975 | Boggs | ................ | B62D 55/15 305/100 |
| 4,209,205 A * | 6/1980 | Gregg | ............... | B62D 55/0887 305/119 |
| 5,302,012 A * | 4/1994 | Dester | ................ | B62D 55/145 305/100 |
| 5,553,931 A * | 9/1996 | Diekevers | ............. | B62D 55/15 305/100 |
| 6,422,664 B1 * | 7/2002 | Hasselbusch | ......... | B62D 55/15 305/135 |
| 6,435,629 B1 * | 8/2002 | Egle | ..................... | B62D 55/08 277/912 |
| 6,481,807 B1 * | 11/2002 | Barani | ................ | B62D 55/08 305/100 |
| 6,874,859 B1 * | 4/2005 | Duse | ..................... | B62D 55/15 305/136 |
| 7,108,337 B2 * | 9/2006 | Yamamoto | ............ | B62D 55/15 305/129 |
| 7,213,894 B2 * | 5/2007 | Yamamoto | ............. | F16C 3/023 305/119 |
| 7,374,257 B2 * | 5/2008 | Oertley | ................. | B62D 55/15 305/136 |
| 8,231,184 B2 * | 7/2012 | Mulligan | .............. | B62D 55/15 305/136 |
| 2005/0040705 A1 | 2/2005 | Yamamoto et al. | | |
| 2011/0121643 A1 | 5/2011 | Mulligan | | |

FOREIGN PATENT DOCUMENTS

| | | |
|---|---|---|
| JP | S51-88747 U | 7/1976 |
| JP | S54-11578 B2 | 5/1979 |
| JP | S56-110079 U | 8/1981 |
| JP | S-58-121776 U | 8/1983 |
| JP | H09-226644 A | 9/1997 |
| JP | 2001-080550 A | 3/2001 |
| JP | 2004-149111 A | 5/2004 |
| JP | 2004-276696 A | 10/2004 |

* cited by examiner

FIG.7

ROLLER OF TRACK-TYPE TRAVELING VEHICLE

TECHNICAL FIELD

The present invention relates to a roller of a track-type traveling vehicle.

BACKGROUND ART

Conventionally, a track-type traveling vehicle such as a hydraulic excavator, a bulldozer, and the like has been used for a work on an uneven terrain. The track-type traveling vehicle includes an idler tumbler and a drive wheel arranged at front and back positions on each of both right and left sides of a traveling body, and an endless crawler belt wound around between the drive wheel and the idler tumbler. On a ground non-engaging surface side of the crawler belt, a plurality of rollers are arranged between the drive wheel and the idler tumbler. Since the plurality of rollers are provided, a ground engaging force during traveling of the track-type traveling vehicle can be ensured, and the vehicle body can be stably supported.

For example, in a roller device disclosed in Japanese Patent Laying-Open No. 9-226644 (PTD 1), a roller shell which abuts a crawler belt link is rotatably provided to an outer circumference of a columnar shaft. A bushing is provided between the roller shell and the shaft. The bushing has a columnar portion which receives a load in a radial direction, and a flange portion which receives a load in a thrust direction.

CITATION LIST

Patent Document

PTD 1: Japanese Patent Laying-Open No. 9-226644

SUMMARY OF INVENTION

Technical Problem

In the roller device described in Japanese Patent Laying-Open No. 9-226644 (PTD 1), the bushing having the columnar portion and the flange portion in an integral manner is provided, and when a roller rotates, the flange portion slides with respect to a boss portion. In a case where the bushing is configured to have a columnar portion and a flange portion provided separately, when a roller rotates, the flange portion also rotates in association with the rotation of the roller, and the flange portion and the roller slide. The flange portion and the roller slide with a high contact pressure, and thereby heat is generated due to frictional resistance. This heat generation results in occurrence of seizure and a reduced life of the bushing.

The present invention has been made in view of the aforementioned problem, and one object of the present invention is to provide a roller of a track-type traveling vehicle in which a bearing supporting a roller shell has an improved sliding abrasion resistance.

Solution to Problem

A roller of a track-type traveling vehicle in accordance with the present invention includes a shaft, a roller shell, a collar, a radial sliding bearing, and a thrust sliding bearing. The shaft has a cylindrical outer circumferential surface. The roller shell is arranged to surround a portion of the outer circumferential surface in a circumferential direction. The roller shell has a cylindrical inner circumferential surface which faces the outer circumferential surface, and an annular end surface. The collar is fixed to the shaft. The collar has an annular facing surface which faces the end surface. The radial sliding bearing is arranged between the outer circumferential surface and the inner circumferential surface. The thrust sliding bearing is arranged between the end surface and the facing surface. The thrust sliding bearing is provided separately from the radial sliding bearing. The roller is provided with an anti-rotation structure. The anti-rotation structure prevents relative rotation of the thrust sliding bearing with respect to the roller shell.

According to the roller in accordance with the present invention, relative rotation of the thrust sliding bearing, which is provided separately from the radial sliding bearing, with respect to the roller shell is prevented. Thus, when the roller shell rotates, the thrust sliding bearing does not slide with respect to the roller shell, and slides with respect to the collar. Since an area in which the thrust sliding bearing is in contact with the collar is larger than an area in which the thrust sliding bearing is in contact with the roller shell, contact pressure generated during sliding can be reduced by sliding the thrust sliding bearing with respect to the collar. As a result, heat generation during the sliding of the thrust sliding bearing supporting the roller shell can be reduced.

In the roller described above, the outer circumferential surface of the shaft has a shape of a cylinder with an identical diameter from a position where the end surface is arranged to a position where the facing surface is arranged, in an axial direction. With this configuration, the outer circumferential surface of the shaft is not provided with a step difference for receiving a thrust load, at a position where the thrust sliding bearing is provided, and the shaft has a shape of a straight shaft having an outer circumferential surface in the shape of a cylinder with an identical diameter. By forming the shaft in such a shape, the shaft can be easily manufactured.

In the roller described above, the anti-rotation structure is joining by engagement between a convex portion formed in one of the roller shell and the thrust sliding bearing and a concave portion formed in the other of the roller shell and the thrust sliding bearing. By applying the above technique to the roller in accordance with the present invention, the anti-rotation structure can be suitably provided.

In the roller described above, the radial sliding bearing and the thrust sliding bearing are formed of materials different from each other. Thereby, the thrust sliding bearing sliding with a relatively high contact pressure can be formed of a material which is resistant to a high contact pressure, and thus the thrust sliding bearing can have a further longer life. By forming only the thrust sliding bearing using an expensive material which is resistant to a high contact pressure and forming the radial sliding bearing using a conventional bearing material, an economically excellent roller can be provided.

In the roller described above, the material forming the thrust sliding bearing has a hardness higher than that of the material forming the radial sliding bearing. With this configuration, the thrust sliding bearing can be provided to be resistant to a higher contact pressure.

In the roller described above, the thrust sliding bearing has an annular plate-shaped body portion having an annular main surface, and a convex portion formed integrally with the body portion and protruding from the main surface. With this configuration, rotation of the thrust sliding bearing with respect to the roller shell can be prevented reliably by engagement between the convex portion formed in the thrust sliding bearing and a concave portion formed in the roller shell.

In the roller described above, an area in which the thrust sliding bearing is in contact with the end surface of the roller shell is smaller than an area in which the thrust sliding bearing is in contact with the facing surface of the collar. With this configuration, contact pressure generated when the thrust sliding bearing slides with respect to the collar in association with rotation of the roller shell can be reduced reliably, and heat generated during the sliding can be reduced reliably.

In the roller described above, in a radial direction of the shaft, a dimension of a portion in which the thrust sliding bearing is in contact with the end surface of the roller shell is smaller than a dimension of a portion in which the thrust sliding bearing is in contact with the facing surface of the collar. With this configuration, contact pressure generated when the thrust sliding bearing slides with respect to the collar in association with rotation of the roller shell can be reduced reliably, and heat generated during the sliding can be reduced reliably.

Advantageous Effects of Invention

As described above, according to the present invention, the bearing supporting the roller shell can have an improved sliding abrasion resistance.

DESCRIPTION OF EMBODIMENTS

Hereinafter, an embodiment of the present invention will be described with reference to the drawings.

First, a description will be given of a configuration of a hydraulic excavator as an example of a track-type traveling vehicle to which the idea of the present invention is applicable. It is noted that the present invention is also applicable to a track-type traveling vehicle such as a bulldozer other than the hydraulic excavator described below.

Figure 1:
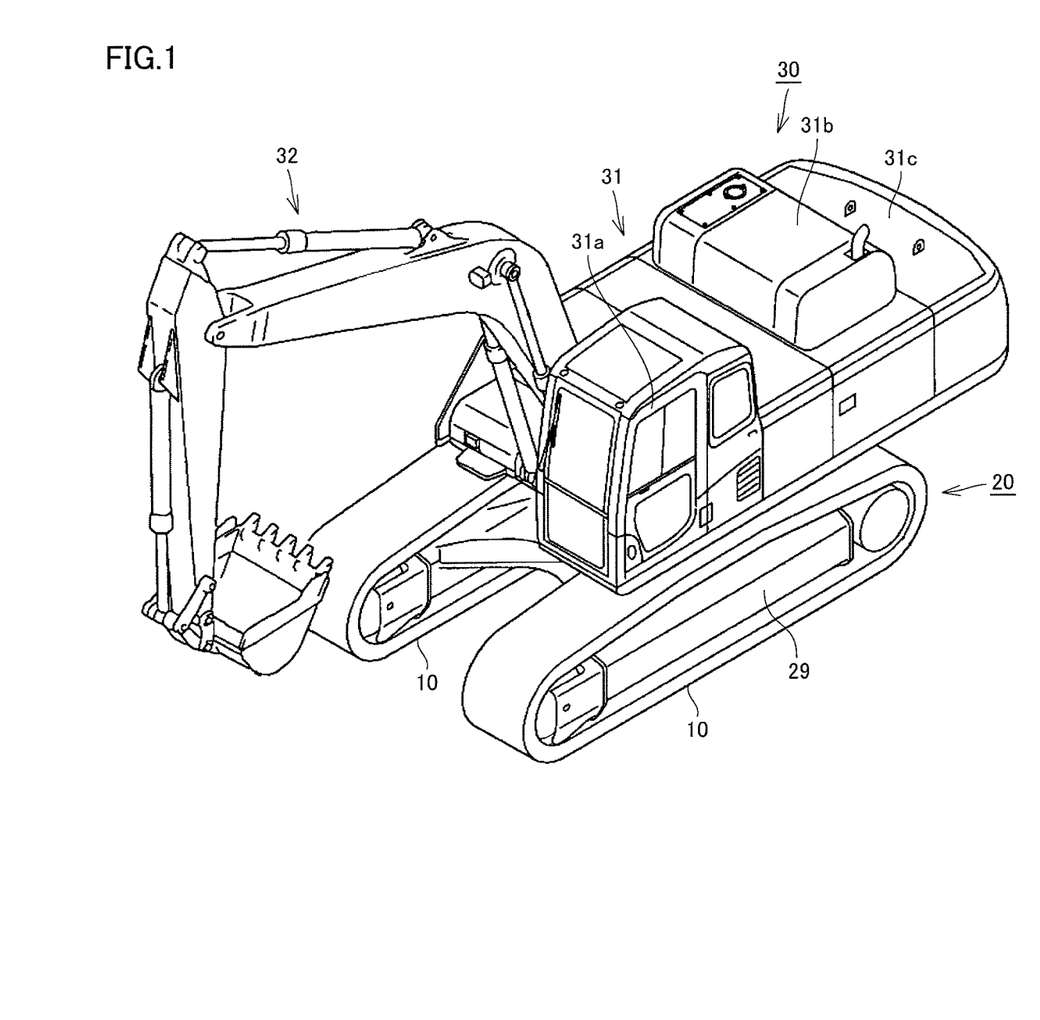
FIG. 1 is a schematic perspective view showing a configuration of a hydraulic excavator as an example of a track-type traveling vehicle having a roller in one embodiment of the present invention.

FIG. 1 is a schematic perspective view showing a configuration of a hydraulic excavator as an example of a track-type traveling vehicle having a roller in one embodiment of the present invention. Referring to FIG. 1, a track-type traveling vehicle (for example, hydraulic excavator) 30 mainly has a travel base structure 20, a revolving superstructure 31, and a work implement 32. Travel base structure 20 and revolving superstructure 31 constitute a main body of the track-type traveling vehicle. Travel base structure 20 has a pair of right and left crawler belt devices 10.

Track-type traveling vehicle 30 is configured to self-propel by rotationally driving the pair of right and left crawler belt devices 10. Travel base structure 20 also has a roller which will be described later in detail.

Revolving superstructure 31 is mounted revolvably with respect to travel base structure 20. Revolving superstructure 31 has a cab 31a on a front left side, and has an engine compartment 31b accommodating an engine and a counterweight 31c on a back side. Here, the front and back/right and left of revolving superstructure 31 are defined with respect to an operator sitting in cab 31a.

Work implement 32 is pivotally supported on the front side of revolving superstructure 31, and has, for example, a boom, an arm, a bucket, hydraulic cylinders, and the like.

Figure 2:
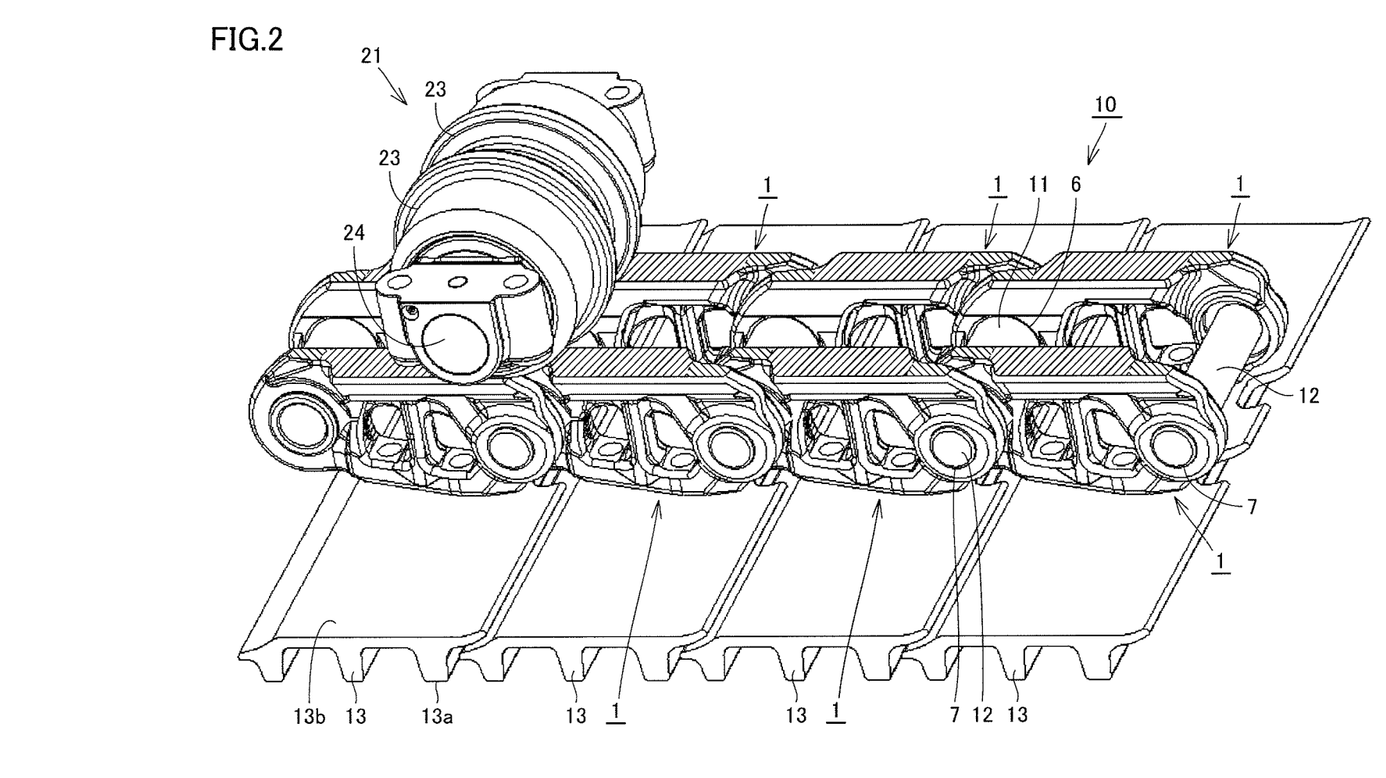
FIG. 2 is a schematic perspective view showing a configuration of a crawler belt device included in the track-type traveling vehicle of FIG. 1.

FIG. 2 is a schematic perspective view showing a configuration of crawler belt device 10 included in the track-type traveling vehicle of FIG. 1. Referring to FIG. 2, crawler belt device 10 mainly has a crawler belt link 1, a bushing 11, a coupling pin 12, and a track shoe plate (shoe plate) 13. Crawler belt device 10 is configured in a looped shape by coupling, in an endless manner, a plurality of crawler belt links 1 having track shoe plates 13 attached thereto.

A bushing hole 6 and a pin hole 7 are formed in crawler belt link 1. In one crawler belt device 10, the plurality of crawler belt links 1 are arranged in two rows. One crawler belt link 1 and the other crawler belt link 1 located adjacent to each other in the same row are overlapped with each other such that bushing hole 6 of one crawler belt link 1 and pin hole 7 of the other crawler belt link 1 are arranged concentrically.

Cylindrical bushing 11 is press-fit into bushing hole 6 of one crawler belt link 1. Coupling pin 12 is inserted into bushing 11, and press-fit into pin hole 7 of the other crawler belt link 1. Thereby, one crawler belt link 1 and the other crawler belt link 1 arranged in the row direction are coupled to each other.

Further, bushing hole 6 of crawler belt link 1 in the first row and pin hole 7 of crawler belt link 1 in the second row are arranged to be concentric to each other. Crawler belt link 1 in the first row is placed on one end side of one bushing 11 and coupling pin 12 as described above, and crawler belt link 1 in the second row is placed on the other end side thereof. Thereby, crawler belt links 1 in one row and the other row are coupled to each other, using bushing 11 and coupling pin 12.

Track shoe plate 13 has a ground engaging surface 13a on a side in contact with the ground, and a ground non-engaging surface 13b opposite to ground engaging surface 13a. Ground engaging surfaces 13a of a plurality of track shoe plates 13 constitute a ground engaging surface of crawler belt device 10. Ground non-engaging surfaces 13b of the plurality of track shoe plates 13 constitute a ground non-engaging surface of crawler belt device 10.

A track roller 21 as an example of a roller in accordance with the present embodiment is arranged on the ground non-engaging surface side of endless crawler belt device 10, and rotates in contact with crawler belt links 1. Track roller 21 is provided at a lower portion of a track frame 29 (see FIG. 1) of travel base structure 20 to guide rotation of crawler belt device 10 via crawler belt links 1. Track roller 21 includes a shaft 24 fixed to track frame 29, and a roller shell 23 which abuts crawler belt links 1.

Figure 3:
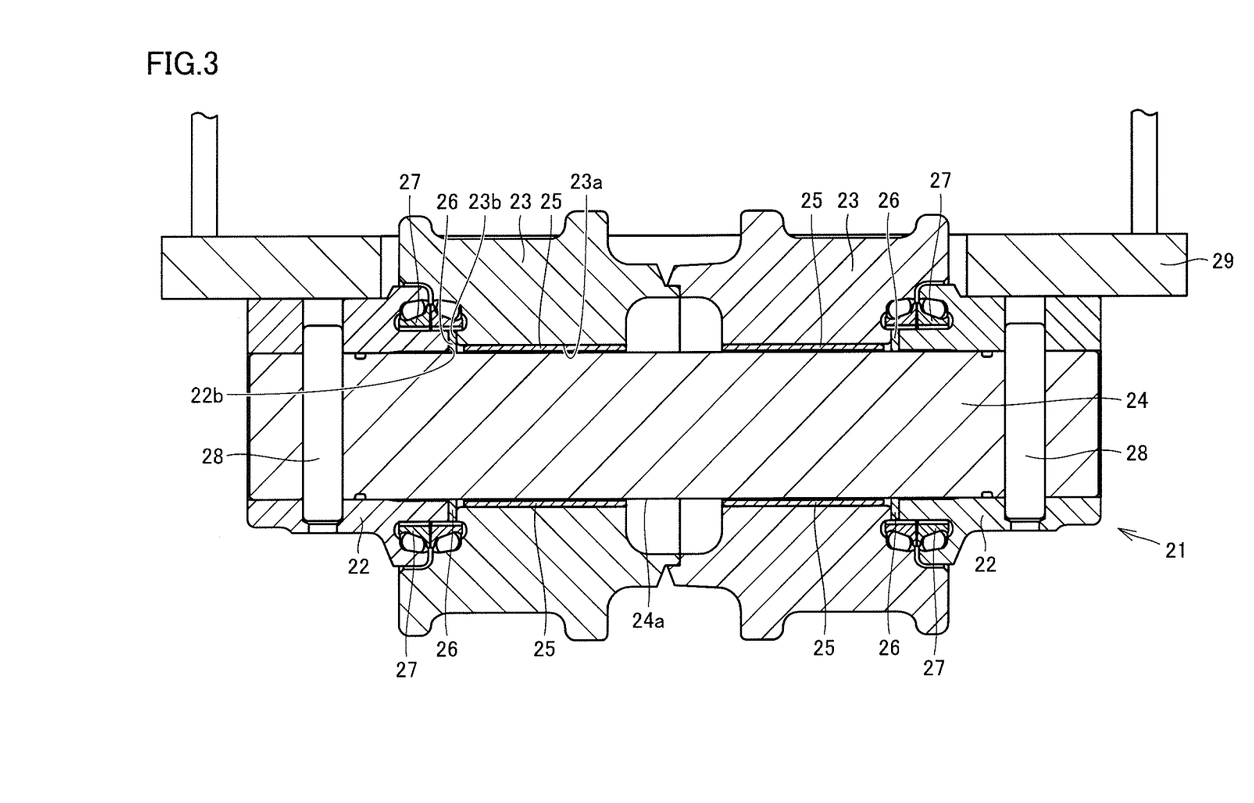
FIG. 3 is a cross sectional view showing a schematic configuration of a track roller of the track-type traveling vehicle in accordance with one embodiment of the present invention.

FIG. 3 is a cross sectional view showing a schematic configuration of track roller 21 of the track-type traveling vehicle in accordance with one embodiment of the present invention. As shown in FIG. 3, shaft 24 is attached to track frame 29. Shaft 24 is formed in the shape of a substantially solid column, and has a cylindrical outer circumferential surface 24a.

Roller shell 23 is arranged to surround a portion of outer circumferential surface 24a of shaft 24 in a circumferential direction. Roller shell 23 is arranged on the outer circumferential side of shaft 24 to be rotatable about the center line of shaft 24. Roller shell 23 has a tubular shape. Roller shell 23 is produced by welding two segments separated at a radial plane including the center of the direction of the center line described above. Shaft 24 is inserted in tubular roller shell 23, and serves as the center of rotation of roller shell 23. Roller shell 23 has a cylindrical inner circumferential surface 23a which faces outer circumferential surface 24a of shaft 24 along a direction of the center of rotation (axial direction), and an annular end surface 23b along a radial direction.

A pair of collars 22 are provided on both end sides of shaft 24 with respect to roller shell 23. Collars 22 are arranged to sandwich roller shell 23 therebetween in the axial direction. Each collar 22 has a tubular shape, and is attached to shaft 24 such that shaft 24 is inserted in a central portion thereof. Collar 22 is fixed to shaft 24 using a pin 28. A floating seal 27 is arranged between collar 22 and roller shell 23. Collar 22 has an annular facing surface 22b. Collar 22 and roller shell 23 are arranged such that facing surface 22b of collar 22 faces end surface 23b of roller shell 23.

A radial sliding bearing 25 is arranged between outer circumferential surface 24a of shaft 24 and inner circumferential surface 23a of roller shell 23. Radial sliding bearing 25 is provided to receive a load in a radial direction (radial direction of shaft 24) and allow relative rotation of roller shell 23 with respect to shaft 24. A thrust sliding bearing 26 is arranged between end surface 23b of roller shell 23 and facing surface 22b of collar 22. Thrust sliding bearing 26 is provided to receive a load in a thrust direction (axial direction of shaft 24) and allow relative rotation of roller shell 23 with respect to collar 22.

Radial sliding bearing 25 and thrust sliding bearing 26 support roller shell 23 in the radial direction and the axial direction such that roller shell 23 is relatively rotatable with respect to shaft 24 and collar 22, respectively. Radial sliding bearing 25 is press fit into inner circumferential surface 23a of roller shell 23, and provided to be rotatable integrally with roller shell 23. Thrust sliding bearing 26 is arranged, with respect to roller shell 23, on a side facing collar 22 in the axial direction.

Figure 4:
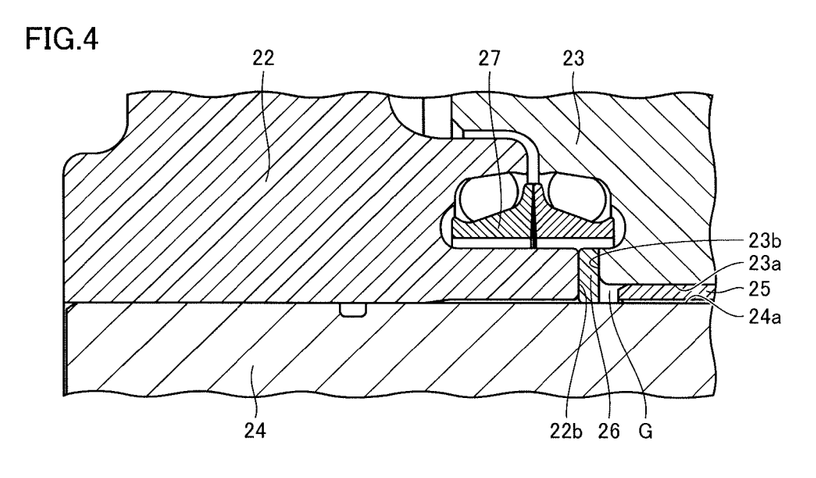
FIG. 4 is a cross sectional view showing the vicinity of a thrust sliding bearing shown in FIG. 3 in an enlarged manner.

FIG. 4 is a cross sectional view showing the vicinity of thrust sliding bearing 26 shown in FIG. 3 in an enlarged manner. Referring to FIG. 4, one of thrust surfaces of thrust sliding bearing 26 is arranged at a position substantially identical to the position of end surface 23b of roller shell 23 in the axial direction of shaft 24 (right-and-left direction in the drawing). The other of the thrust surfaces of thrust sliding bearing 26 is arranged at a position substantially identical to the position of facing surface 22b of collar 22 in the axial direction of shaft 24.

A gap G is formed between thrust sliding bearing 26 and radial sliding bearing 25. Radial sliding bearing 25 and thrust sliding bearing 26 are arranged so as not to contact with each other. Radial sliding bearing 25 and thrust sliding bearing 26 are provided as separate members completely separated by gap G.

In the radial direction of shaft 24 (top-and-bottom direction in the drawing), hollow cylindrical radial sliding bearing 25 is arranged between outer circumferential surface 24a of shaft 24 and inner circumferential surface 23a of roller shell 23. Annular plate-shaped thrust sliding bearing 26 has an inner circumferential end surface with a diameter substantially identical to an outer diameter of shaft 24. Thrust sliding bearing 26 has an outer circumferential end surface located at a position which is radially outward with respect to outer circumferential surface 24a of shaft 24 and is away from outer circumferential surface 24a.

Collar 22 is arranged from outer circumferential surface 24a of shaft 24 to the outer circumferential end surface of thrust sliding bearing 26 in the radial direction of shaft 24. Facing surface 22b of collar 22 is provided to face a substantially entire surface of one thrust surface of thrust sliding bearing 26 (on the left side in FIG. 4). Since radial sliding bearing 25 is arranged between shaft 24 and roller shell 23, end surface 23b of roller shell 23 is provided to face only a radially outward portion of the other thrust surface of thrust sliding bearing 26. That is, of the other thrust surface of thrust sliding bearing 26 (on the right side in FIG. 4), a portion in the vicinity of the inner circumferential end surface of thrust sliding bearing 26 is arranged at a position not facing end surface 23b of roller shell 23.

Outer circumferential surface 24a of shaft 24 has a shape of a cylinder with an identical diameter from a position where end surface 23b of roller shell 23 is arranged to a position where facing surface 22b of collar 22 is arranged, in the axial direction of shaft 24. Outer circumferential surface 24a of shaft 24 is not provided with a step difference for receiving a thrust load, at a portion spanning thrust sliding bearing 26 in the axial direction, and shaft 24 has a shape of a straight shaft having cylindrical outer circumferential surface 24a.

Radial sliding bearing 25 and thrust sliding bearing 26 provided separately are formed of materials different from each other. Preferably, the material forming thrust sliding bearing 26 has a hardness higher than that of the material forming radial sliding bearing 25. As the material forming thrust sliding bearing 26, a material having a Brinell hardness double or more that of the material forming radial sliding bearing 25 may be applied. For example, when the material forming radial sliding bearing 25 has a Brinell hardness of 100, a material having a Brinell hardness of 200 or more may be selected as the material forming thrust sliding bearing 26.

Specifically, as the material forming radial sliding bearing 25, a lead bronze casting (Cu—Sn—Pb-based alloy) such as CAC603 specified by BS (Japanese Industrial Standards) H 5120 may be applied. On this occasion, as the material forming thrust sliding bearing 26, a high-strength brass casting (Cu—Zn—Mn—Fe—Al-based alloy) having more excellent mechanical properties such as CAC301, CAC302, CAC303, or CAC304 specified by JIS H 5120 may be applied.

Figure 5:
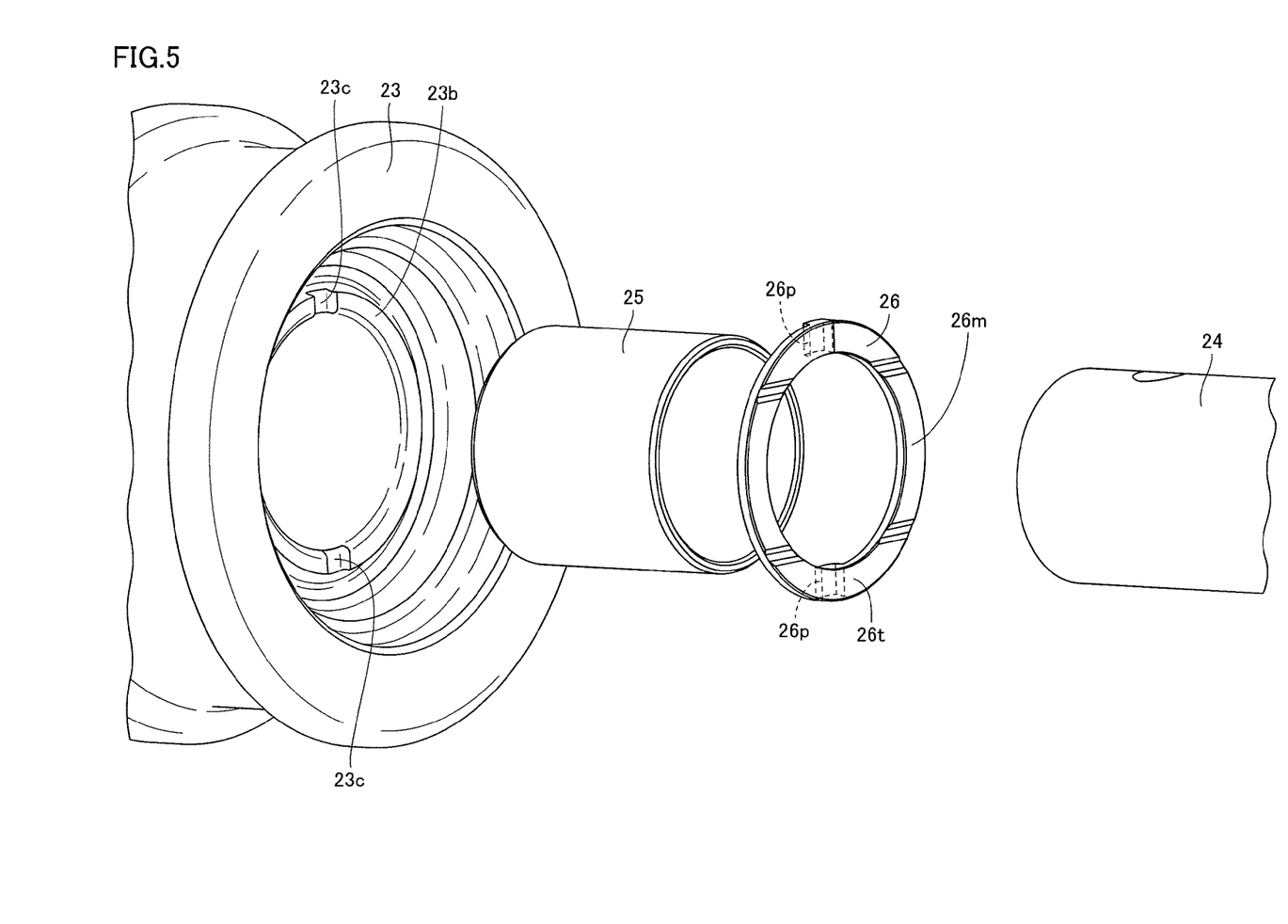
FIG. 5 is an exploded perspective view of some of components of the track roller shown in FIG. 3.
Figure 6:
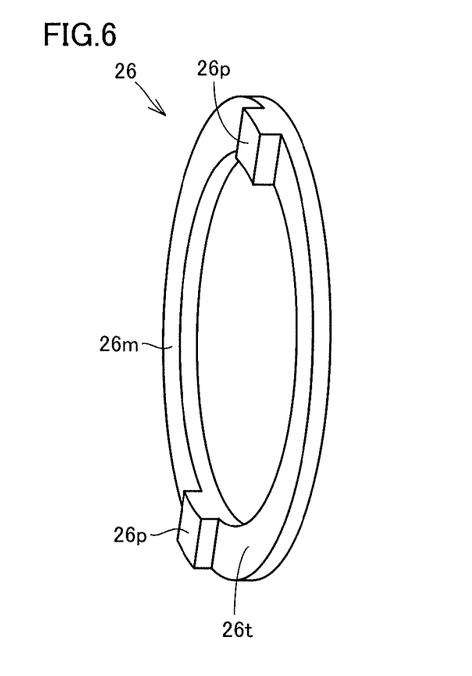
FIG. 6 is a perspective view of the thrust sliding bearing.

FIG. 5 is an exploded perspective view of some of the components of track roller 21 shown in FIG. 3. FIG. 6 is a perspective view of thrust sliding bearing 26. Referring to FIGS. 5 and 6, thrust sliding bearing 26 is provided separately from radial sliding bearing 25. Thrust sliding bearing 26 has an annular plate-shaped body portion 26m. Body portion 26m has annular main surfaces 26t on one side and the other side in the direction of the center of rotation. Main surface 26*t* on one side faces end surface 23*b* of roller shell 23, and main surface 26*t* on the other side faces facing surface 22*b* of collar 22. Main surfaces 26*t* have a function as the thrust surfaces receiving a thrust force between roller shell 23 and collar 22.

Thrust sliding bearing 26 further has convex portions 26*p* protruding from main surface 26*t* on one side of body portion 26*m*. Convex portions 26*p* are provided in main surface 26*t* at two positions. Convex portions 26*p* extend in the radial direction of annular main surface 26*t*, and are formed from the inner circumferential end surface to the outer circumferential end surface of thrust sliding bearing 26. Convex portions 26*p* at two positions are formed such that they extend in a direction which is on an identical straight line passing through the center of annular main surface 26*t*.

Convex portion 26*p* is formed integrally with body portion 26*m*. Such thrust sliding bearing 26 can be easily formed by molding the material by casting and further cutting the material for shaping. Convex portion 26*p* may be formed to protrude from main surface 26*t* to the same extent as the thickness of body portion 26*m*. For example, when body portion 26*m* has a thickness of 3.5 mm, a distance between a leading end of convex portion 26*p* and main surface 26*t* from which convex portion 26*p* protrudes in a thickness direction of thrust sliding bearing 26 may also be set to 3.5 mm.

In end surface 23*b* of roller shell 23 shown in FIG. 5, concave portions 23*c* where portions of end surface 23*b* are recessed are formed. Each concave portion 23*c* is configured to be able to accommodate convex portion 26*p* therein. Concave portions 23*c* are formed in annular end surface 23*b* of roller shell 23 at two positions, and formed to extend in the radial direction of end surface 23*b*. Concave portions 23*c* at two positions are formed such that they extend in a direction which is on an identical straight line passing through the center of annular end surface 23*b*. The shape of concave portion 23*c* is determined corresponding to the shape of convex portion 26*p*. Convex portion 26*p* and concave portion 23*c* are formed such that convex portion 26*p* fits in concave portion 23*c* with no space therebetween, or with a minute space between a surface of convex portion 26*p* and an inner surface of concave portion 23*c*.

Since convex portions 26*p* formed in thrust sliding bearing 26 engage concave portions 23*c* formed in roller shell 23, when roller shell 23 rotates, thrust sliding bearing 26 rotates together with roller shell 23. Engagement between convex portions 26*p* and concave portions 23*c* has a function as an anti-rotation structure which prevents relative rotation of thrust sliding bearing 26 with respect to roller shell 23.

The number of convex portions 26*p* and concave portions 23*c* may be any number. From the viewpoints of decreasing the material forming thrust sliding bearing 26 and fully exercising the function of preventing rotation of thrust sliding bearing 26 with respect to roller shell 23, it is desirable to form two convex portions 26*p* and two concave portions 23*c* as described above.

Figure 7:
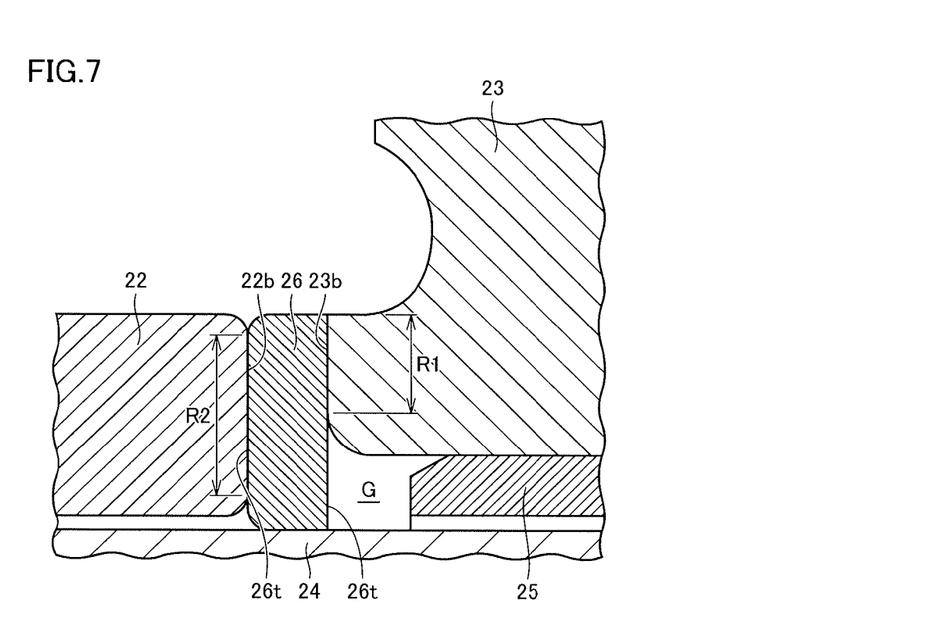
FIG. 7 is a cross sectional view showing details of arrangement of the thrust sliding bearing with respect to a roller shell and a collar.

FIG. 7 is a cross sectional view showing details of arrangement of thrust sliding bearing 26 with respect to roller shell 23 and collar 22. One of main surfaces 26*t* of thrust sliding bearing 26 which function as the thrust surfaces (on the right side in FIG. 7) is arranged to face end surface 23*b* of roller shell 23. A radial dimension R1 shown in FIG. 7 indicates a dimension of a portion of main surface 26*t* which is in contact with end surface 23*b* of roller shell 23, in the radial direction. The other of main surfaces 26*t* (on the left side in FIG. 7) is arranged to face facing surface 22*b* of collar 22. A radial dimension R2 shown in FIG. 7 indicates a dimension of a portion of main surface 26*t* which is in contact with facing surface 22*b* of collar 22, in the radial direction.

When radial dimensions R1, R2 are compared with each other, radial dimension R1 is smaller than radial dimension R2. That is, a relational expression R1<R2 is established. Thus, an area in which one main surface 26*t* of thrust sliding bearing 26 is in contact with end surface 23*b* of roller shell 23 is smaller than an area in which the other main surface 26*t* is in contact with facing surface 22*b* of collar 22. When the rotation of thrust sliding bearing 26 with respect to roller shell 23 is prevented by the engagement between concave portions 23*c* and convex portions 26*p* described above, thrust sliding bearing 26 slides with respect to collar 22. Thrust sliding bearing 26 is in contact with collar 22, which serves as a mating sliding member for sliding, in a larger area.

Next, the functions and effects of the present embodiment will be described.

According to the present embodiment, as shown in FIG. 5, thrust sliding bearing 26 arranged between end surface 23*b* of roller shell 23 and facing surface 22*b* of collar 22 is provided separately from radial sliding bearing 25. Track roller 21 is provided with an anti-rotation structure which prevents relative rotation of thrust sliding bearing 26 with respect to roller shell 23.

When thrust sliding bearing 26 is provided as a member separate from radial sliding bearing 25, thrust sliding bearing 26 slides with respect to either one of end surface 23*b* and facing surface 22*b* to support roller shell 23 to be relatively rotatable with respect to collar 22. Since the area in which thrust sliding bearing 26 is in contact with collar 22 is larger than the area in which thrust sliding bearing 26 is in contact with roller shell 23 as described with reference to FIG. 7, contact pressure generated during sliding can be reduced by sliding thrust sliding bearing 26 with respect to collar 22.

By providing the anti-rotation structure to track roller 21 in the present embodiment, when roller shell 23 rotates, thrust sliding bearing 26 does not slide with respect to roller shell 23, and slides with respect to collar 22. Thereby, contact pressure acting during the sliding of thrust sliding bearing 26 is reduced, and as a result, heat generation during the sliding can be reduced. Accordingly, occurrence of seizure of thrust sliding bearing 26 can be suppressed.

In track-type traveling vehicle 30, reduction of the diameter of track roller 21 may be considered for the purpose of avoiding interference between track roller 21 and track frame 29, and the like. When the diameter of track roller 21 is reduced, the area in which thrust sliding bearing 26 is in contact with collar 22 is reduced, and thus contact pressure acting on thrust sliding bearing 26 is increased. By applying the configuration of the present embodiment, contact pressure generated during the sliding of thrust sliding bearing 26 can be reduced. That is, the configuration of the present embodiment can be applied particularly advantageously in a case where it is intended to reduce the diameter of the roller.

Further, as shown in FIG. 4, outer circumferential surface 24*a* of shaft 24 has a shape of a cylinder with an identical diameter from the position where end surface 23*b* of roller shell 23 is arranged to the position where facing surface 22*b* of collar 22 is arranged, in the axial direction of shaft 24. With this configuration, outer circumferential surface 24*a* of shaft 24 is not provided with a step difference for receiving a thrust load, at a position where thrust sliding bearing 26 is provided in the axial direction of shaft 24, and shaft 24 has a shape of a straight shaft having an outer circumferential surface in the shape of a cylinder with an identical diameter. By forming shaft 24 in such a shape, shaft 24 can be easily manufactured.

Further, as shown in FIGS. 5 and 6, the anti-rotation structure is configured by the engagement between concave portions 23c formed in roller shell 23 and convex portions 26p formed in thrust sliding bearing 26. Thereby, the anti-rotation structure can be formed with a simple structure.

Further, radial sliding bearing 25 and thrust sliding bearing 26 provided separately are formed of materials different from each other. Thereby, thrust sliding bearing 26 sliding with a relatively high contact pressure can be formed of a material which is resistant to a high contact pressure, such as a high-strength brass casting, and thus thrust sliding bearing 26 can have a further longer life. By forming only thrust sliding bearing 26 using an expensive material and forming radial sliding bearing 25 using a conventional inexpensive bearing material, economically excellent track roller 21 can be provided.

Further, the material forming thrust sliding bearing 26 has a hardness higher than that of the material forming radial sliding bearing 25. For example, thrust sliding bearing 26 may be formed of a high-strength brass casting, and radial sliding bearing 25 may be formed of a lead bronze casting. With this configuration, thrust sliding bearing 26 can be provided to be resistant to a higher contact pressure.

Further, as shown in FIG. 6, thrust sliding bearing 26 has annular plate-shaped body portion 26m having annular main surfaces 26t, and convex portions 26p formed integrally with body portion 26m and protruding from main surface 26t. With this configuration, rotation of thrust sliding bearing 26 with respect to roller shell 23 can be prevented reliably by the engagement between convex portions 26p formed in thrust sliding bearing 26 and concave portions 23c formed in roller shell 23.

Further, as shown in FIG. 7, the area in which thrust sliding bearing 26 is in contact with end surface 23b of roller shell 23 is smaller than the area in which thrust sliding bearing 26 is in contact with facing surface 22b of collar 22. With this configuration, contact pressure generated when thrust sliding bearing 26 slides with respect to collar 22 in association with rotation of roller shell 23 can be reduced reliably, and heat generated during the sliding can be reduced reliably.

Further, as shown in FIG. 7, in the radial direction of shaft 24, radial dimension R1 of a portion in which thrust sliding bearing 26 is in contact with end surface 23b of roller shell 23 is smaller than radial dimension R2 of a portion in which thrust sliding bearing 26 is in contact with facing surface 22b of collar 22. With this configuration, contact pressure generated when thrust sliding bearing 26 slides with respect to collar 22 in association with rotation of roller shell 23 can be reduced reliably, and heat generated during the sliding can be reduced reliably.

The above description has described an example in which the anti-rotation structure which prevents relative rotation of thrust sliding bearing 26 with respect to roller shell 23 is configured by the engagement between convex portions 26p formed in thrust sliding bearing 26 and concave portions 23c formed in roller shell 23. The anti-rotation structure is not limited thereto.

For example, the anti-rotation structure may be configured by joining of roller shell 23 and thrust sliding bearing 26 by any of brazing, adhesion, and welding. Specifically, as joining by welding, nickel may be underlaid on end surface 23b of roller shell 23, and an annular plate member of a high-strength brass casting may be joined to end surface 23b by gas tungsten arc welding, to form thrust sliding bearing 26.

As joining by adhesion, end surface 23b of roller shell 23 may be treated with zinc phosphate/chromate, an annular plate member of a high-strength brass casting may be treated with an aqueous solution of nitric acid, and the plate member may be joined to roller shell 23 with an epoxy adhesive, to form thrust sliding bearing 26.

As joining by brazing, a groove for a brazing filler metal may be provided in end surface 23b of roller shell 23, and an annular plate member of a high-strength brass casting may be brazed with brass brazing filler metal.

Further, when thrust sliding bearing 26 has a sufficient thickness, arrangement of the concave portions and the convex portions may be reversed to form concave portions in thrust sliding bearing 26 and form convex portions in roller shell 23. Furthermore, in addition to the above example in which thrust sliding bearing 26 and radial sliding bearing 25 are arranged so as not to contact with each other, with gap G interposed therebetween, for example, concave portions receiving convex portions 26p may be formed in radial sliding bearing 25. In this case, the concave portions may be formed on an extension of concave portions 23c formed in roller shell 23 in the radial direction of shaft 24.

Shaft 24 is not limited to a cylindrical straight shaft as shown in FIG. 3, and a stepped shaft with a step difference in a shape whose diameter is reduced toward an end portion may also be applied.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

10: crawler belt device; 13: track shoe plate; 13a: ground engaging surface; 13b: ground non-engaging surface; 20: travel base structure; 21: track roller; 22: collar; 22b: facing surface; 23: roller shell; 23a: inner circumferential surface; 23b: end surface; 23c: concave portion; 24: shaft; 24a: outer circumferential surface; 25: radial sliding bearing; 26: thrust sliding bearing; 26m: body portion; 26p: convex portion; 26t: main surface; 30: track-type traveling vehicle.

The invention claimed is:
1. A roller of a track-type traveling vehicle, comprising:
a shaft having a cylindrical outer circumferential surface;
a roller shell arranged to surround a portion of said outer circumferential surface in a circumferential direction, and having a cylindrical inner circumferential surface which faces said outer circumferential surface, and an annular end surface;
a collar fixed to said shaft such that the collar does not rotate relative to the shaft and having an annular facing surface which faces said end surface;
a radial sliding bearing arranged between said outer circumferential surface and said inner circumferential surface; and
a thrust sliding bearing arranged between said end surface and said facing surface, and provided separately from said radial sliding bearing, the thrust sliding bearing having an annular plate-shaped body portion with one main surface being annular and in contact with the end surface of the roller shell and another main surface being annular and in contact with the facing surface of the collar, said roller being provided with an anti-rotation structure which prevents relative rotation of said thrust sliding bearing with respect to said roller shell.

2. The roller of a track-type traveling vehicle according to claim 1, wherein said outer circumferential surface has a shape of a cylinder with an identical diameter from a position where said end surface is arranged to a position where said facing surface is arranged, in an axial direction of said shaft.

3. The roller of a track-type traveling vehicle according to claim 2, wherein said thrust sliding bearing has a convex portion formed integrally with said body portion and protruding from said main surface.

4. The roller of a track-type traveling vehicle according to claim 2, wherein an area in which said thrust sliding bearing is in contact with said end surface is smaller than an area in which said thrust sliding bearing is in contact with said facing surface.

5. The roller of a track-type traveling vehicle according to claim 4, wherein, in a radial direction of said shaft, a dimension of a portion in which said thrust sliding bearing is in contact with said end surface is smaller than a dimension of a portion in which said thrust sliding bearing is in contact with said facing surface.

6. The roller of a track-type traveling vehicle according to claim 1, wherein said radial sliding bearing and said thrust sliding bearing are formed of materials different from each other.

7. The roller of a track-type traveling vehicle according to claim 6, wherein the material forming said thrust sliding bearing has a hardness higher than that of the material forming said radial sliding bearing.

8. The roller of a track-type traveling vehicle according to claim 7, wherein said thrust sliding bearing has a convex portion formed integrally with said body portion and protruding from said main surface.

9. The roller of a track-type traveling vehicle according to claim 7, wherein an area in which said thrust sliding bearing is in contact with said end surface is smaller than an area in which said thrust sliding bearing is in contact with said facing surface.

10. The roller of a track-type traveling vehicle according to claim 9, wherein, in a radial direction of said shaft, a dimension of a portion in which said thrust sliding bearing is in contact with said end surface is smaller than a dimension of a portion in which said thrust sliding bearing is in contact with said facing surface.

11. The roller of a track-type traveling vehicle according to claim 6, wherein said thrust sliding bearing has a convex portion formed integrally with said body portion and protruding from said main surface.

12. The roller of a track-type traveling vehicle according to claim 6, wherein an area in which said thrust sliding bearing is in contact with said end surface is smaller than an area in which said thrust sliding bearing is in contact with said facing surface.

13. The roller of a track-type traveling vehicle according to claim 12, wherein, in a radial direction of said shaft, a dimension of a portion in which said thrust sliding bearing is in contact with said end surface is smaller than a dimension of a portion in which said thrust sliding bearing is in contact with said facing surface.

14. The roller of a track-type traveling vehicle according to claim 1, wherein said thrust sliding bearing has a convex portion formed integrally with said body portion and protruding from said main surface.

15. The roller of a track-type traveling vehicle according to claim 1, wherein an area in which said thrust sliding bearing is in contact with said end surface is smaller than an area in which said thrust sliding bearing is in contact with said facing surface.

16. The roller of a track-type traveling vehicle according to claim 15, wherein, in a radial direction of said shaft, a dimension of a portion in which said thrust sliding bearing is in contact with said end surface is smaller than a dimension of a portion in which said thrust sliding bearing is in contact with said facing surface.

17. A roller of a track-type traveling vehicle, comprising:
a shaft having a cylindrical outer circumferential surface;
a roller shell arranged to surround a portion of said outer circumferential surface in a circumferential direction, and having a cylindrical inner circumferential surface which faces said outer circumferential surface, and an annular end surface;
a collar fixed to said shaft and having an annular facing surface which faces said end surface;
a radial sliding bearing arranged between said outer circumferential surface and said inner circumferential surface; and
a thrust sliding bearing arranged between said end surface and said facing surface, and provided separately from said radial sliding bearing,
said roller being provided with an anti-rotation structure which prevents relative rotation of said thrust sliding bearing with respect to said roller shell,
wherein said anti-rotation structure is engagement between a convex portion formed in one of said roller shell and said thrust sliding bearing and a concave portion formed in the other of said roller shell and said thrust sliding bearing.

18. The roller of a track-type traveling vehicle according to claim 17, wherein said thrust sliding bearing has an annular plate-shaped body portion having an annular main surface, and a convex portion formed integrally with said body portion and protruding from said main surface.

19. The roller of a track-type traveling vehicle according to claim 17, wherein an area in which said thrust sliding bearing is in contact with said end surface is smaller than an area in which said thrust sliding bearing is in contact with said facing surface.

20. The roller of a track-type traveling vehicle according to claim 19, wherein, in a radial direction of said shaft, a dimension of a portion in which said thrust sliding bearing is in contact with said end surface is smaller than a dimension of a portion in which said thrust sliding bearing is in contact with said facing surface.

* * * * *